US012246509B2

(12) United States Patent
Van Der Kaap et al.

(10) Patent No.: US 12,246,509 B2
(45) Date of Patent: Mar. 11, 2025

(54) COILER FOR A DUNNAGE CONVERSION MACHINE AND METHOD FOR COILING A STRIP OF DUNNAGE

(71) Applicant: Ranpak Corp., Concord Township, OH (US)

(72) Inventors: Jordy Van Der Kaap, Schimmert (NL); Ron H. J. Hendrix, Urmond (NL); Ruud E. J. Bruls, Schimmert (NL)

(73) Assignee: Ranpak Corp., Concord Township, OH (US)

(*) Notice: Subject to any disclaimer, the term of this patent is extended or adjusted under 35 U.S.C. 154(b) by 75 days.

(21) Appl. No.: 18/193,485

(22) Filed: Mar. 30, 2023

(65) Prior Publication Data

US 2023/0234319 A1 Jul. 27, 2023

Related U.S. Application Data

(63) Continuation of application No. 17/421,906, filed as application No. PCT/US2020/013897 on Jan. 16, 2020, now Pat. No. 11,673,361.

(Continued)

(51) Int. Cl.
*B31D 5/00* (2017.01)
*B65H 54/58* (2006.01)

(52) U.S. Cl.
CPC ......... *B31D 5/0069* (2013.01); *B65H 54/585* (2013.01); *B31D 2205/0017* (2013.01); *B31D 2205/007* (2013.01); *B31D 2205/0082* (2013.01)

(58) Field of Classification Search
CPC ................ B31D 5/0039; B31D 5/0069; B31D 2205/0017; B31D 2205/007; B31D 2205/0082; B65H 54/585
See application file for complete search history.

(56) References Cited

U.S. PATENT DOCUMENTS 1,354,565 A * 10/1920 James .................... B65H 49/30 242/577.4
2,577,168 A 12/1951 Volckhausen
2016/0001519 A1* 1/2016 Winkens ................ B65H 18/08 156/361

FOREIGN PATENT DOCUMENTS

CA 2216124 A1 8/1996
GB 1073781 A 6/1967

(Continued)

OTHER PUBLICATIONS

International Search Report and Written Opinion issued Apr. 20, 2020, for International Patent Application No. PCT/US2020/013897.

(Continued)

*Primary Examiner* — Thomas M Wittenschlaeger
(74) *Attorney, Agent, or Firm* — Renner, Otto, Boisselle & Sklar, LLP

(57) ABSTRACT

A coiler for producing tighter or smaller coils of dunnage uses a cam to move fork pins from a dunnage-receiving position inwardly to a more closely-spaced coiling position. The fork pins are coupled to pin mounts that cooperate with the cam and slots in a guide plate to move the parallel fork pins between the dunnage-receiving and coiling positions. The fork pins are mounted to extend perpendicular to and through the guide plate on opposing sides of a path of the dunnage to capture and wind a dunnage strip into a coil.

20 Claims, 15 Drawing Sheets

Related U.S. Application Data

(60) Provisional application No. 62/796,970, filed on Jan. 25, 2019.

(56) References Cited

FOREIGN PATENT DOCUMENTS

| | | | |
|---|---|---|---|
| WO | 1999021702 | A2 | 5/1999 |
| WO | 2014127061 | A2 | 8/2014 |

OTHER PUBLICATIONS

International Preliminary Report on Patentability issued Jul. 27, 2021, for International Patent Application No. PCT/US2020/013897.

* cited by examiner

COILER FOR A DUNNAGE CONVERSION MACHINE AND METHOD FOR COILING A STRIP OF DUNNAGE

This application is a Continuation and claims priority of U.S. patent application Ser. No. 17/421,906, filed Jul. 9, 2021, which is a National Phase of International Patent Application No. PCT/US2020/013897, filed Jan. 16, 2020, which claims the benefit of U.S. Provisional Patent Application No. 62/796,970, filed Jan. 25, 2019, each of which is hereby incorporated herein by reference in its entirety.

FIELD OF THE INVENTION

The present invention is related to a coiler for a dunnage conversion machine and method for producing and coiling a strip of dunnage.

BACKGROUND

In the process of shipping one or more articles from one location to another, a packer typically places a type of dunnage material in a shipping container, such as a cardboard box, along with the article or articles to be shipped. The dunnage material prevents or minimizes movement of the articles that might be damaged during the shipping process. Some commonly used dunnage materials include plastic airbags and converted paper dunnage material.

To promote continuous operation, many dunnage conversion machines, whether producing airbags or paper dunnage material, output a strip of dunnage that may be cut or severed to provide sections of dunnage of desired lengths. When using the dunnage material to block or brace a relatively large or heavy item during shipping, the strip of dunnage may be rolled up in a coil configuration. The coil of dunnage may then be placed in the shipping container beside, above, or below the large/heavy item to be shipped. While coils of dunnage material can be produced by hand, such a procedure may consume a significant amount of time or space and manual coiling may lead to inconsistent properties in the coil. Consequently, automated coiling mechanisms have been developed to address one or more of these and other problems.

International Patent Application Publication No. WO 99/21702 describes a system for coiling a strip of dunnage produced by a cushioning conversion machine. A sheet stock material provided from a roll is converted into a strip of relatively lower density cushioning material, which is then wound about rotating forks into a coiled configuration.

SUMMARY

Depending on the size, shape, and weight of the item to be shipped, a user may want to adjust the density or size of the coiled strip of dunnage. While automated coiling mechanisms are known, a need remains for a dunnage system and method that allows for the customization of the density or size of the coil while providing an automated system for producing a consistent coil.

The present invention provides a coiler having an automated coiler fork that allows for the movement of the fork pins to adjust the density and size of the coil. Specifically, the fork pins can move inwardly following receipt therebetween of a leading end of a strip of dunnage to form a smaller coil or a tighter coil than that provided by a coiler with fixed coiler fork pins.

Thus, an exemplary coiler includes a pair of moveable pins. The coiler also may have at least one pin mount, and may include a cam for guiding movement of a pin. The pair of moveable pins extends in a common direction and is rotatable about a common axis to wind a strip of dunnage into a coil. The at least one pin mount supports one of the moveable pins for movement between a strip receiving position and a coiling position radially-inwardly disposed relative to the strip receiving position. The cam guides the pin mount and the moveable pin for movement. Alternatively, the pin mount may rotate about an axis offset from the pin.

The coiler may further include a guide plate that cooperates with the cam and the pin mount to control the movement of the moveable pin. The guide plate may include a slot through which the pin extends to guide movement of the moveable pin.

The pin mount may be connected to the guide plate at a fixed pivot point.

The guide plate may be coupled to a motor for rotation.

The common axis may be parallel to the direction in which the moveable pins extend.

The cam may include a curved bearing surface against which the pin mount rides as the cam rotates relative to the pin mount. The curved bearing surface may include a grooved spiral surface. The grooved spiral surface may have ramped ends that stop the pin mounts from moving, thereby placing the moveable pins in the coiling position.

The coiler may be provided in combination with a dunnage conversion machine that converts a stock material into the strip of dunnage to be coiled, the dunnage conversion machine dispensing the strip of dunnage from an outlet. The combination also may include a supply of stock material for conversion into a relatively less dense dunnage product. The stock material may include one or more of a sheet of paper and a sheet of kraft paper.

A guide surface may be provided, positioned between the outlet of the dunnage conversion machine and the coiler to guide the strip of dunnage to the coiler.

The present invention also provides a method of coiling a strip of dunnage. The method includes the steps of (a) providing such a coiler as described herein, (b) receiving the strip of dunnage between the pair of moveable pins, (c) moving the pair of moveable pins from the strip receiving position to the coiling position by rotating the guide plate, and (d) winding the strip of dunnage into a coil by rotating the moveable pins.

The providing step (a) may include (i) supplying a sheet sock material, preferably paper, to a dunnage conversion machine, (ii) converting the sheet stock material into a relatively lower density strip of dunnage, and (iii) dispensing the strip of dunnage from the dunnage conversion machine.

The moving step (c) may begin after a leading end of the strip of dunnage passes between the pair of moveable pins.

The method may include the step of removing the coil in its coiled state from the pair of moveable pins after the winding step (d) is complete.

The method may include the step of guiding each of the pair of moveable pins from the coiling position back to the strip receiving position.

The method may include the step of rotatably aligning the pair of moveable pins along a line transverse to a path of the strip of dunnage.

Finally, the method may include the step of controlling a speed of the coiler as a function of a speed of the strip of dunnage being fed to the coiler and a desired size of the coil.

The foregoing and other features are hereinafter fully described and particularly pointed out in the claims, the following description and annexed drawings setting forth in detail certain illustrative embodiments, these embodiments being indicative, however, of but a few of the various ways in which the principles of the invention may be employed.

DETAILED DESCRIPTION

Figure 1:
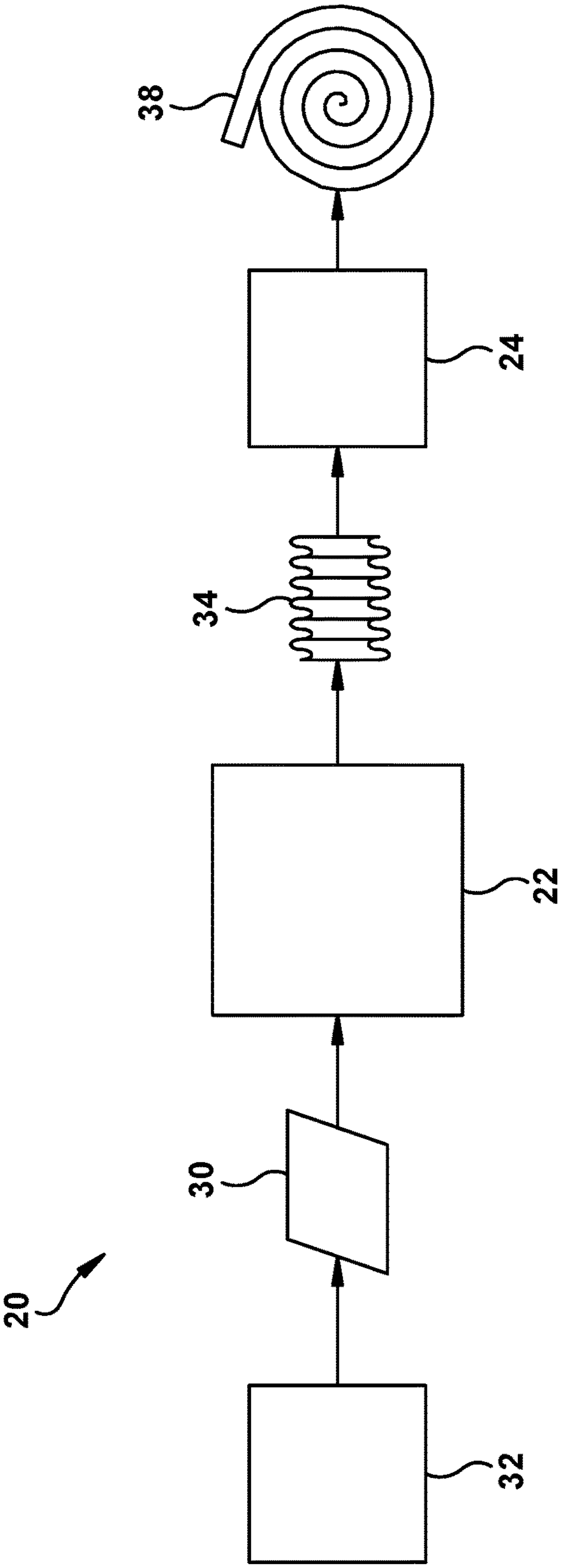
FIG. 1 is a schematic representation of an exemplary dunnage conversion system.
Figure 2:
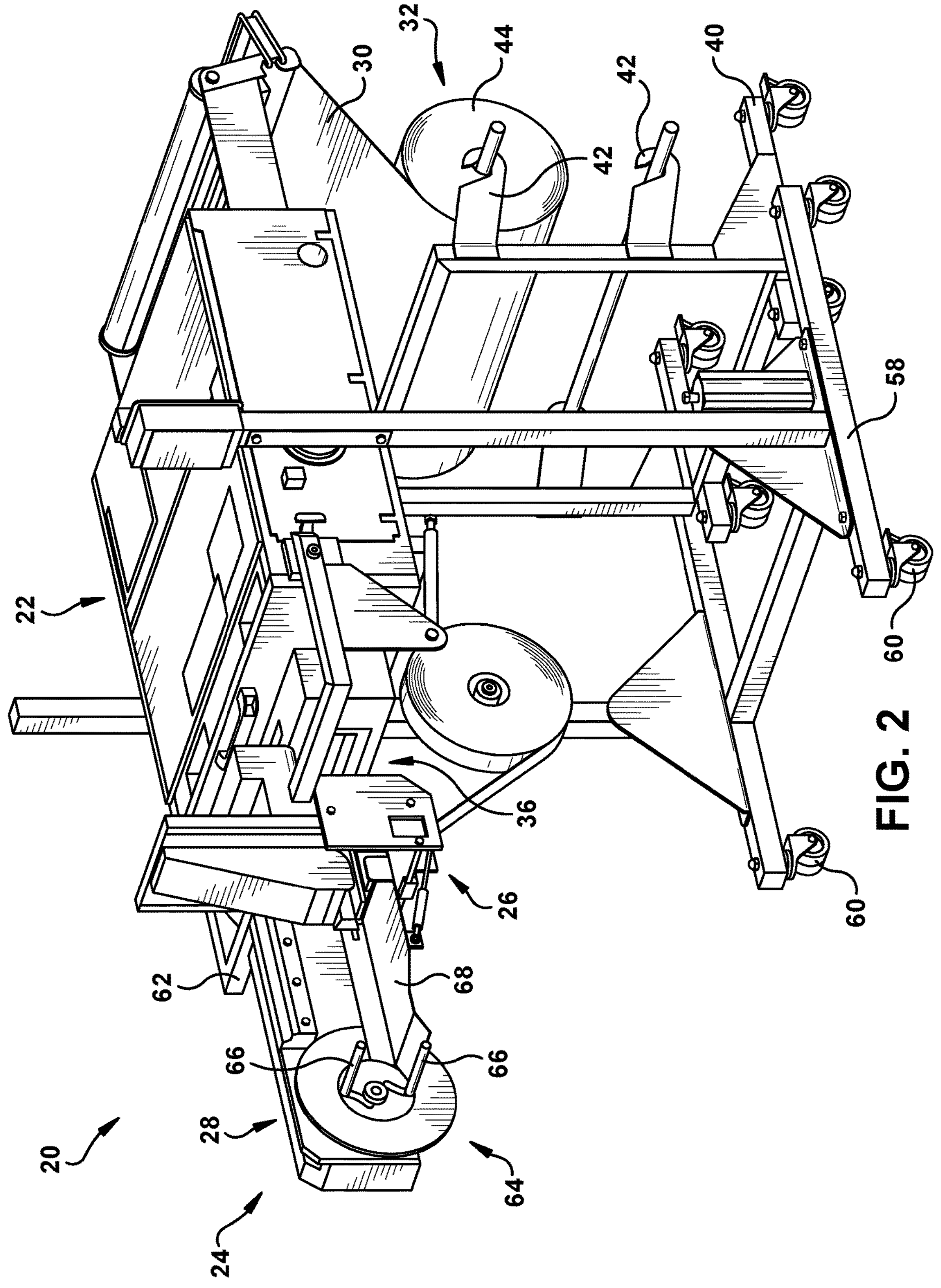
FIG. 2 is a perspective view of an exemplary dunnage conversion system employing a coiler.
Figure 3:
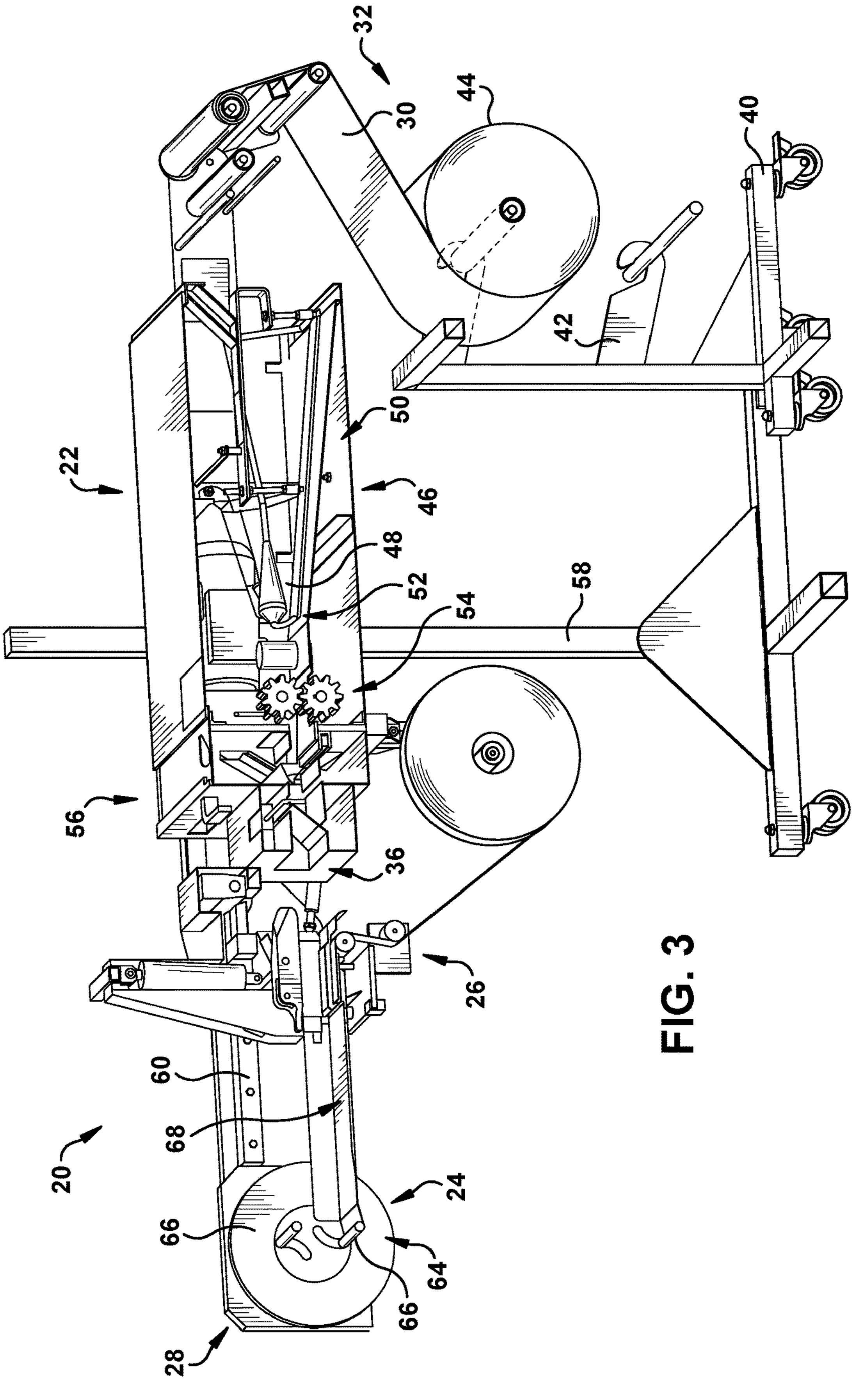
FIG. 3 is a cross-sectional view of the dunnage conversion system of FIG. 2.
Figure 4:
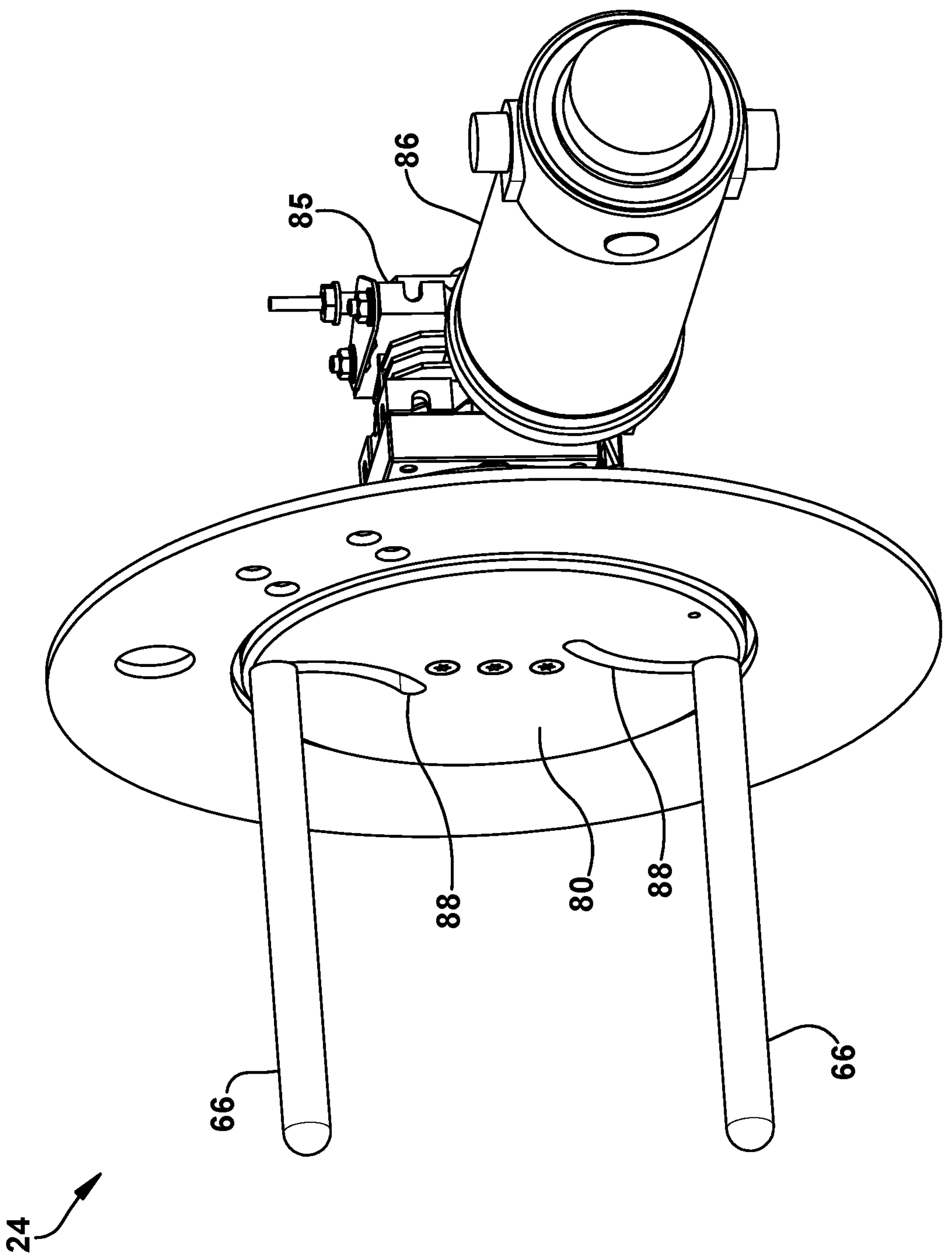
FIG. 4 is a perspective view of the coiler of FIG. 2.
Figure 5:
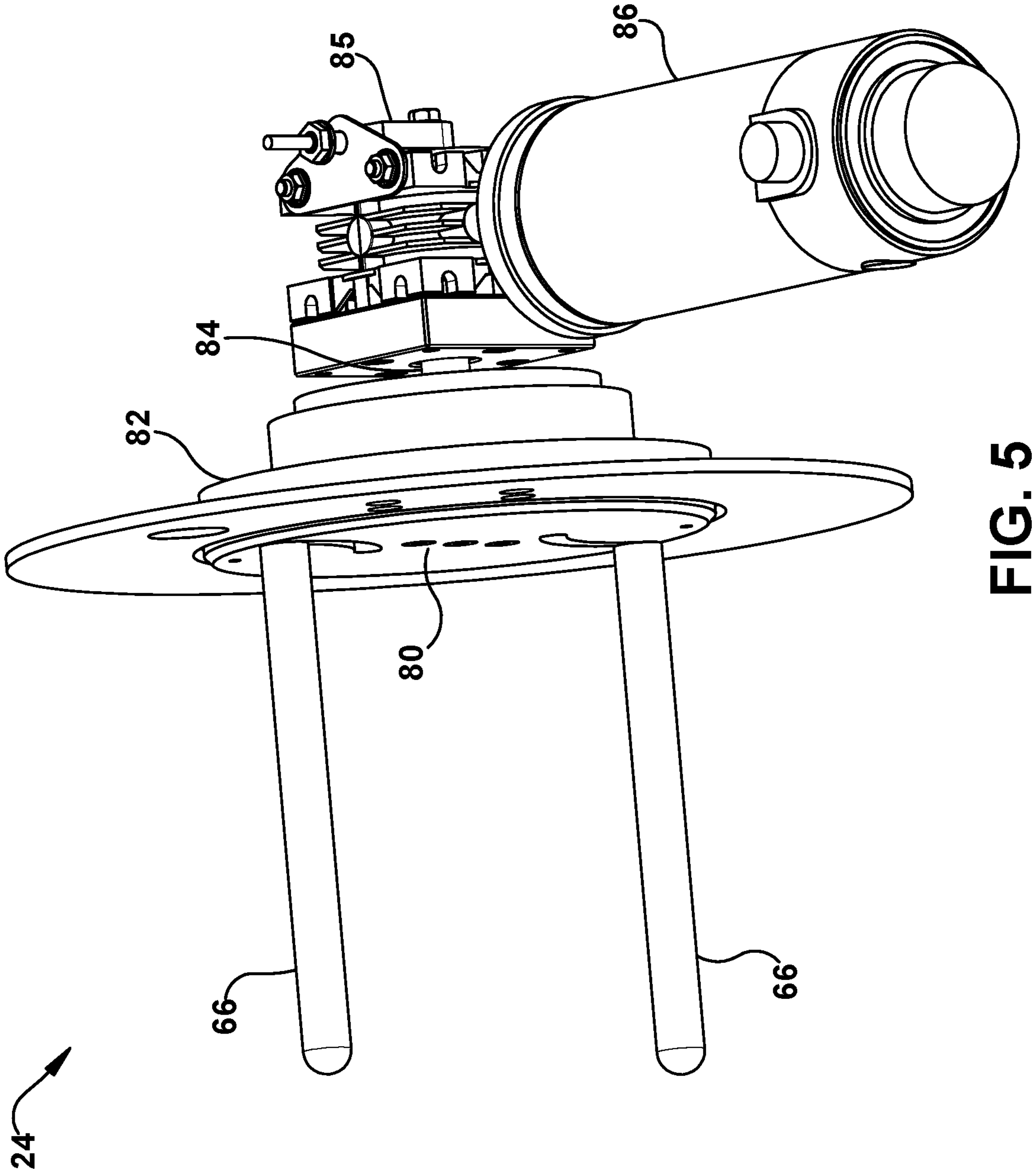
FIG. 5 is another perspective view of the coiler of FIG. 2
Figure 6:
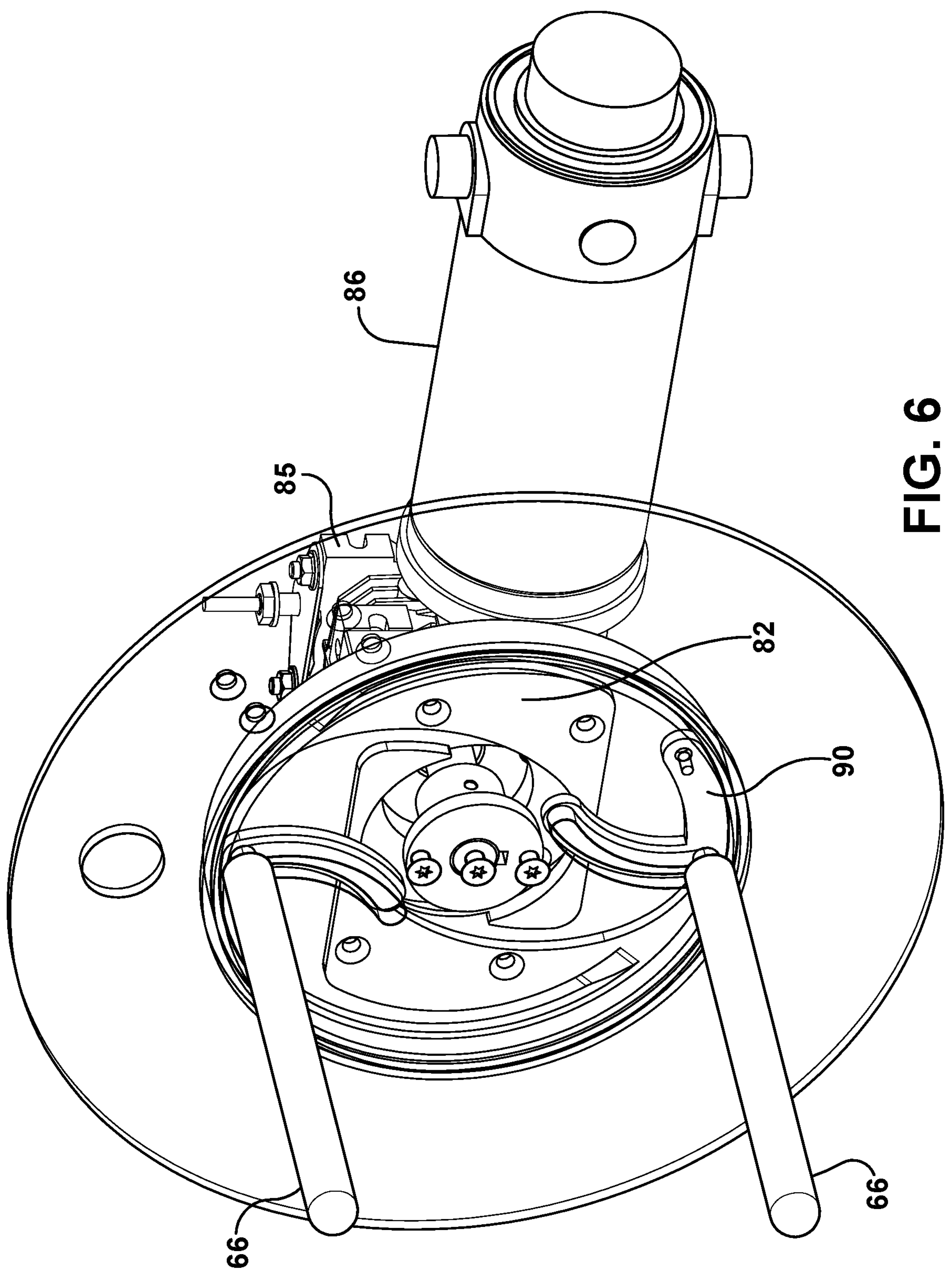
FIG. 6 is a partial cross-sectional view of the coiler of FIG. 2 with the guide plate removed.
Figure 7:
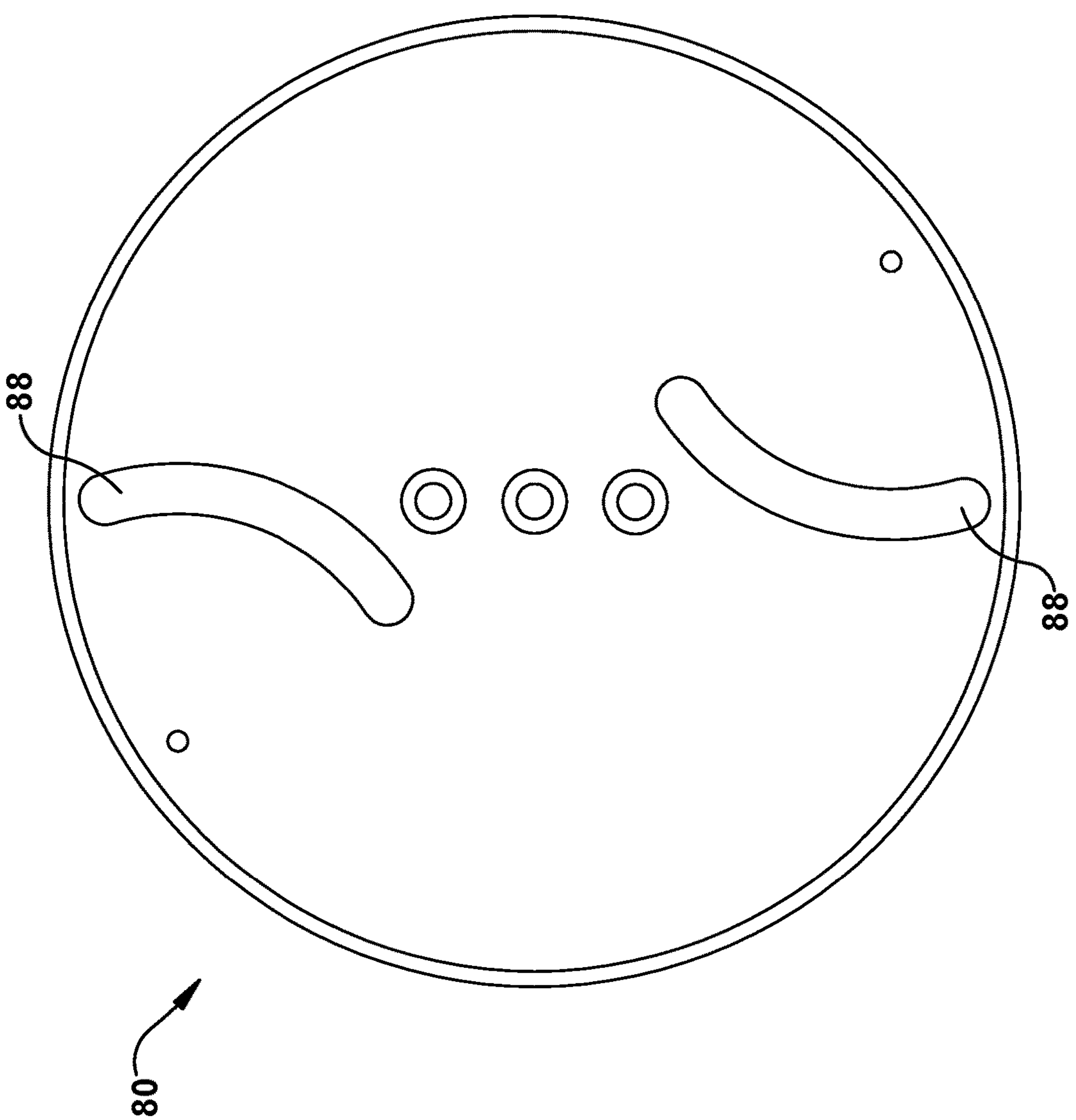
FIG. 7 is a plan view of the guide plate of the coiler of FIG. 2.
Figure 8:
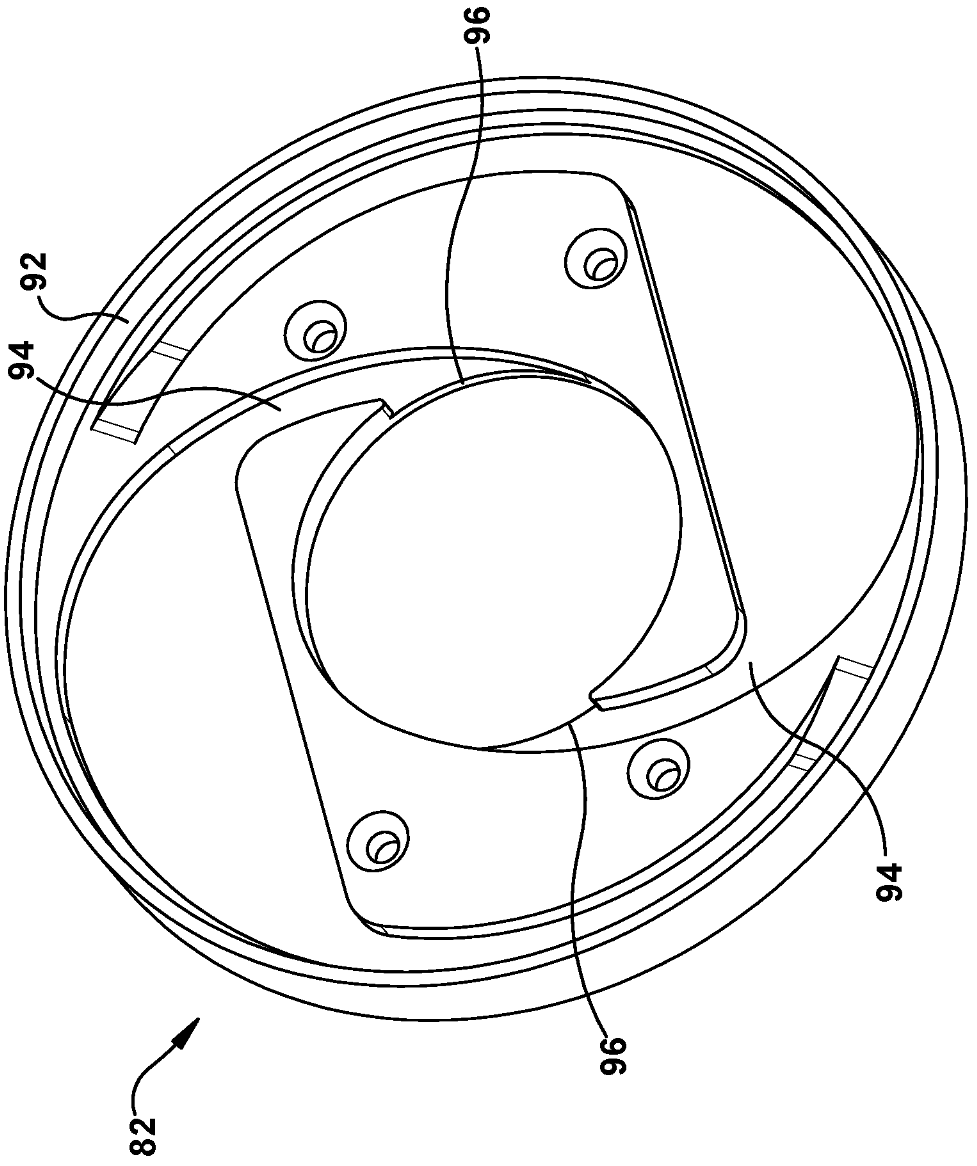
FIG. 8 is a perspective view of the cam of the coiler of FIG. 2.

Referring now to the drawings in detail, an initially to FIGS. 1-3, an exemplary dunnage conversion system 20 that includes a supply of a strip of dunnage, such as a dunnage conversion machine 22 (sometimes referred to as a "converter"), and a coiling mechanism 24 for selectively coiling the strip of dunnage to provide a desired density or size of the coil. The system 20 may further include a taping mechanism 26 and an ejecting mechanism 28. The dunnage conversion machine 22 converts a sheet stock material 30 drawn from a supply 32 into a relatively less dense strip of dunnage 34. The strip 34 exits an outlet 36 of the conversion machine 22 and is rolled or wound into a coil 38 by the coiling mechanism 24. A trailing end of the coiled strip of dunnage may be automatically secured to the coil 38 by the taping mechanism 26. The finished coil 38 may be automatically ejected from the coiling mechanism 24 by the coil ejecting mechanism 28.

An exemplary supply 32 of stock material 30 includes a mobile cart 40 with one or more pairs of laterally-spaced arms 42 capable of supporting one or more rolls 44 of sheet stock material 30. An exemplary sheet stock material 30 is kraft paper, and the kraft paper may be supplied wound onto a roll, as shown, or provided in a fan-folded stack. Paper is recyclable, reusable, and composed of a renewable resource, making it an environmentally responsible choice as a stock material An exemplary dunnage conversion machine is shown in FIGS. 2 and 3. During the conversion process, the dunnage conversion machine 22 shapes the sheet stock material 30 to form a strip of dunnage that is relatively less dense than the sheet stock material 30 from which it is produced. In the illustrated dunnage conversion machine 22, the sheet stock material 30 travels through a forming mechanism 46 that includes a chute 48 that converges in a downstream direction from a chute inlet 50 to a relatively smaller chute outlet 52, inwardly turning edge portions and randomly crumpling the sheet stock material as it travels through the chute 48. The crumpled stock material then passes through a feeding/connecting mechanism 54 downstream of the forming assembly 46 that both feeds the sheet stock material through the conversion machine 22 and connects overlapping layers of sheet stock material to help the finished strip of dunnage maintain its shape. Once a desired length of dunnage has been produced, a separating mechanism 56 downstream of the feeding/connecting mechanism 54 separates the completed dunnage strip from the supply 32 of sheet stock material 30. The illustrated dunnage conversion machine 22 is not the only type of dunnage conversion machine that may be employed in the system 20, however, and any dunnage conversion machine that converts a sheet stock material into a length or strip of relatively lower density dunnage may be used in this system 20. A supply of a strip of dunnage that does not include a dunnage conversion machine also may be an acceptable alternative.

The illustrated dunnage conversion machine 22 is mounted on a stand 58 that has wheels 60 for mobility. But any type of support for the dunnage conversion machine 22 may be provided, as may be necessary to support the conversion machine 22 and the coiling mechanism 24 at a sufficient elevation to produce a coil 38.

The coiling mechanism 24, also referred to as a coiler, lies downstream of the dunnage conversion machine 22 and in the illustrated embodiment is supported by a frame extension 62 mounted to the frame of the dunnage conversion machine 22 or to the stand 58. The coiler 24 includes a rotatable coiling fork 64 with a pair of substantially parallel and movable coiling pins 66 (also referred to as fork pins, or simply pins). The coiling fork 64 and movable pins 66 rotate about a central coiling axis. The rotation of the coiling fork 64 and fork pins 66 may be driven by a motor or other driving mechanism, and the motor may be mounted in the frame extension 62. A guide surface 68 extends from the outlet 36 of the dunnage conversion machine 22 toward the coiling mechanism 24 to guide a strip of dunnage from the outlet 36 to the coiling fork 64.

In a starting orientation, the coiling fork 64 and the moveable pins 66 are configured to receive a strip of dunnage guided thereto by the guide surface 68. The moveable pins 66 of the coiling fork 64 generally are positioned along an axis or other line that is transverse to the guide surface 68 and to the coiling axis, preferably perpendicular to the guide surface 68, to receive a leading end of the strip of dunnage between the pins 66. Each of the pair of moveable pins 66 are aligned along a line transverse to a path of the strip of dunnage. Once a leading end of a strip of dunnage passes between the movable pins 66 of the fork 64, the fork 64 can rotate to wind the strip of dunnage into a coil as the dunnage strip is produced. Further reference to an exemplary dunnage conversion machine and coiler can be had with reference to International Publication No. WO 99/21702, referred to above.

The strip of dunnage is produced from the dunnage conversion machine 22 or other supply to the coiling mechanism 24 at a constant rate, but the rotation rate of the coiling fork 64 can be varied as a function of the size of the coil to vary the density, consistency, and other properties of the coil.

The coiler shown in more detail in FIGS. 4-8 includes an automated coiler fork that allows for the movement of the fork pins to adjust the density and size of the coil. The coiler 24 includes a guide plate 80, a pair of parallel moveable pins 66, and a cam 82. The guide plate 80 is substantially flat on both sides and is coupled to a drive shaft 84 of a motor 86 for rotation. A gearbox 85 is mounted between the coiler fork and the motor 86 to adjust the speed of rotation about the coiling axis. The guide plate 80 includes radially-extending curved slots 88 for guiding the pins 66 between radially-displaced inward and outward positions.

The moveable pins 66 extend in a common direction generally perpendicular to the guide plate 80. The pair of moveable pins 66 are rotatable about the common coiling axis to wind a strip of dunnage into a coil. The coiling axis generally is parallel to the direction in which the pins 66 extend. The moveable pins 66 extend through respective slots 88 and are each coupled to a U-shaped pin mount 90 in approximately the middle of the U-shape. One end of each pin mount 90 is connected to the guide plate 80 in close proximity to an outer edge of the guide plate 80.

The cam 82 includes a protruding outer rim 92 within which the guide plate 80, pin mounts 90, and movable pins 66 are received. The cam 82 includes several curved control or bearing surfaces recessed from a front face of the outer rim 92. The pin mounts 90 follow the features of the surface of the cam 82. This interaction between the pin mounts 90 and the cam 82 causes the parallel pins 66 to be moved along the radially-extending curved slots 88 of the guide plate 80 from a strip receiving position to a coiling position radially inwardly disposed relative to the strip receiving position. The pins 66 and are spaced relatively closer together in the coiling position than in the strip receiving position. The control surfaces include a grooved spiral surface 94 that a portion of the pin mounts 90 rides against as the guide plate 80 rotates relative to the cam 82. The grooved spiral surface 94 is defined by a groove in the cam 82 with a varying depth, including ramped ends 96 that stop the pin mounts 90 from moving, thereby placing the pins 66 in the coiling position.

Figure 10:
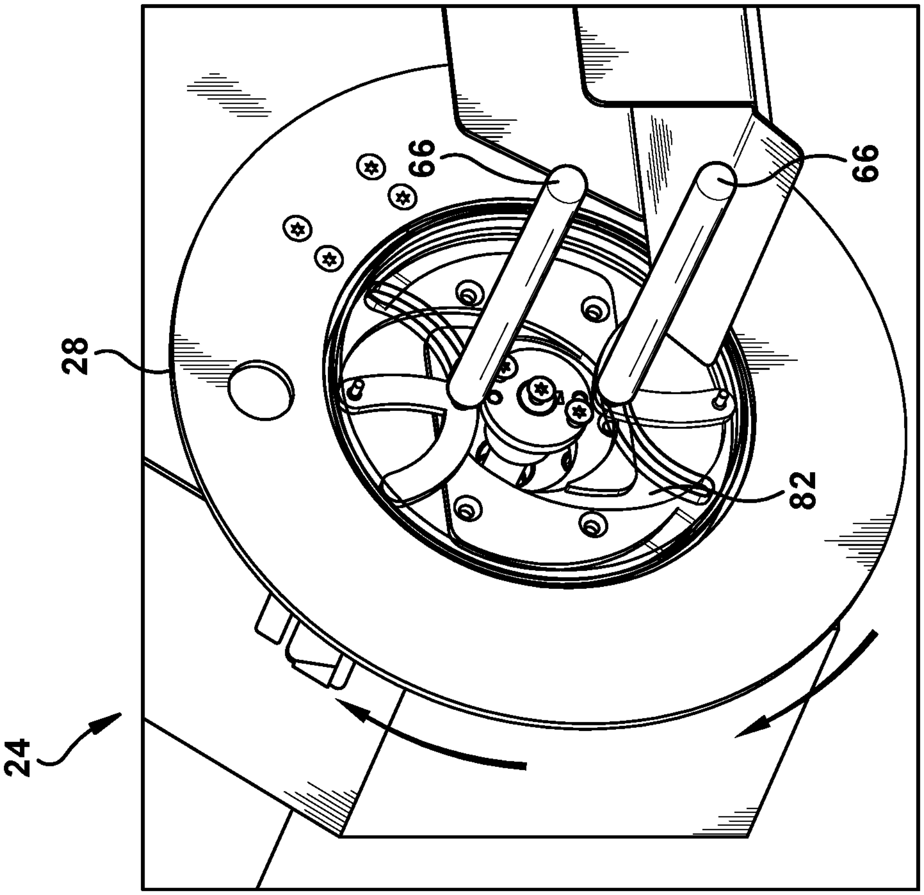
FIG. 10 is perspective view of the coiler of FIG. 6 where the pair of moveable pins are in the coiling position.
Figure 9:
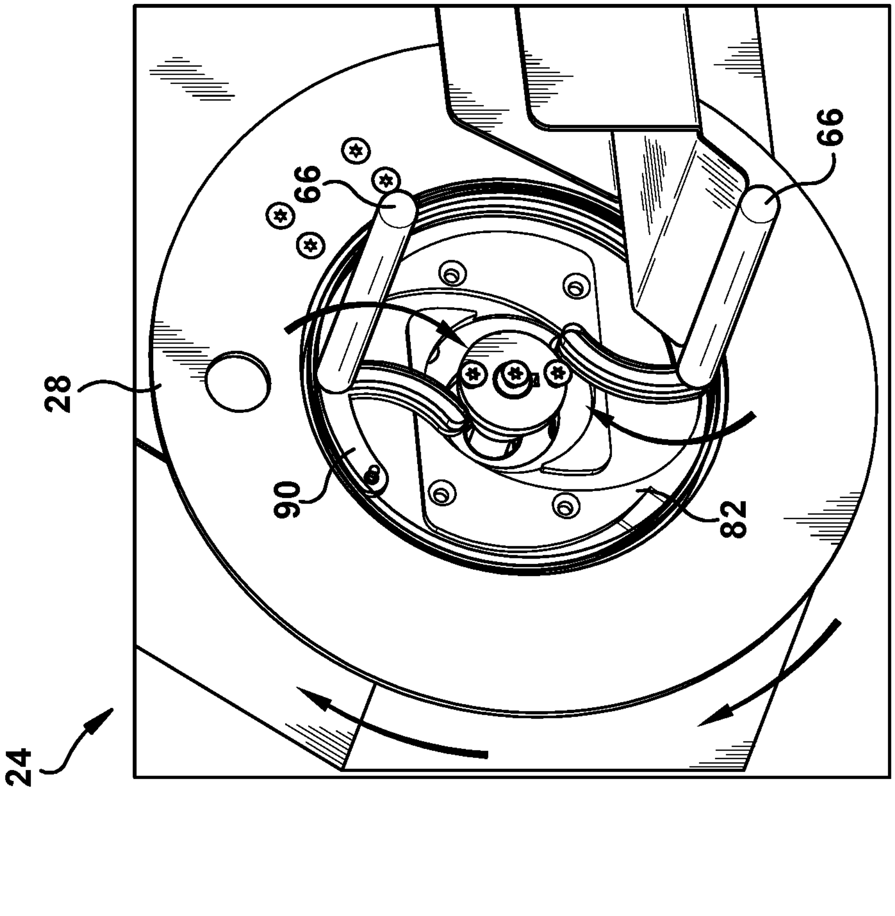
FIG. 9 is perspective view of the coiler of FIG. 6 where the pair of moveable pins are in the strip receiving position.

Referring now to FIG. 9, during operation of the dunnage conversion machine 22 (FIGS. 2 and 3), the leading end of the strip of dunnage (not shown) is advanced between the pair of moveable pins 66, which are located at a strip receiving position. Once the strip of dunnage is received between the moveable pins 66, the motor 86 (FIGS. 4-6) drives the rotation of the guide plate 80 about the coiling axis (FIGS. 4 and 5) (e.g., clockwise). The pin mounts 90 will follow the control surfaces of the cam 82, causing the pair of pins 66 to move from the strip receiving position to the coiling position radially inwardly disposed relative to the strip receiving position as shown in FIG. 10. Once the pin mounts 90 reach the ends 96 of the grooved spiral surface 94 (FIG. 8) of the cam 82, rotation of the coiling fork 64 about the coiling axis winds the strip of dunnage into a coil.

As mentioned above, the pins 66 are located closer to each other when positioned in the coiling position than when positioned in the strip receiving position. Moving the pins 66 closer together increases the density of the center of the resulting coil, and also reduces the outer diameter of the resulting coil for the same number of rotations. The inherent resilient nature of the strip of dunnage allows the coiler to more tightly coil the strip to increase the density of the coil relative to the density of the strip of dunnage.

Once a desired length of the strip of dunnage has been produced, the separating mechanism 56 (FIG. 3) in the dunnage conversion machine will sever the strip of dunnage from the remaining stock material. The automated taping mechanism 26 (FIGS. 2 and 3) may apply tape to a trailing end of the strip of dunnage to adhere the trailing end of the strip to an adjacent winding of the coil, thereby holding the strip of dunnage in the coiled configuration. The coil ejecting mechanism 28 includes an ejector plate that may push the completed coil axially off of the pins 66. An operator may then place the coiled strip of dunnage into a box or other container for packing purposes.

After the coil is pushed off of the pins 66, the coiling mechanism 24 may rotate in the opposite direction from coiling (e.g., counterclockwise), to move the pin mounts 90 back along the control surfaces of the cam 82, and return the pair of pins 66 from the coiling position to the strip receiving position. The coiling mechanism 24 also rotates the coiling fork 64 about the coiling axis to the strip receiving position, aligning the pins 66 along an axis across the path of the strip of dunnage exiting the dunnage conversion machine 22 and guided to the coiling mechanism 24 by the guide surface 68.

In summary, the present invention provides a coiler 24 for producing tighter or smaller coils of dunnage using a cam 82 to move fork pins 66 from a dunnage-receiving position inwardly to a more closely-spaced coiling position. The fork pins 66 are coupled to pin mounts 90 that cooperate with the cam 82 and slots 88 in a guide plate 80 to move the parallel fork pins 66 between the dunnage-receiving and coiling positions. The fork pins 66 are mounted to extend perpendicular to and through the guide plate 80 on opposing sides of a path of the dunnage to capture and wind a dunnage strip 34 into a coil 38.

Figure 11:
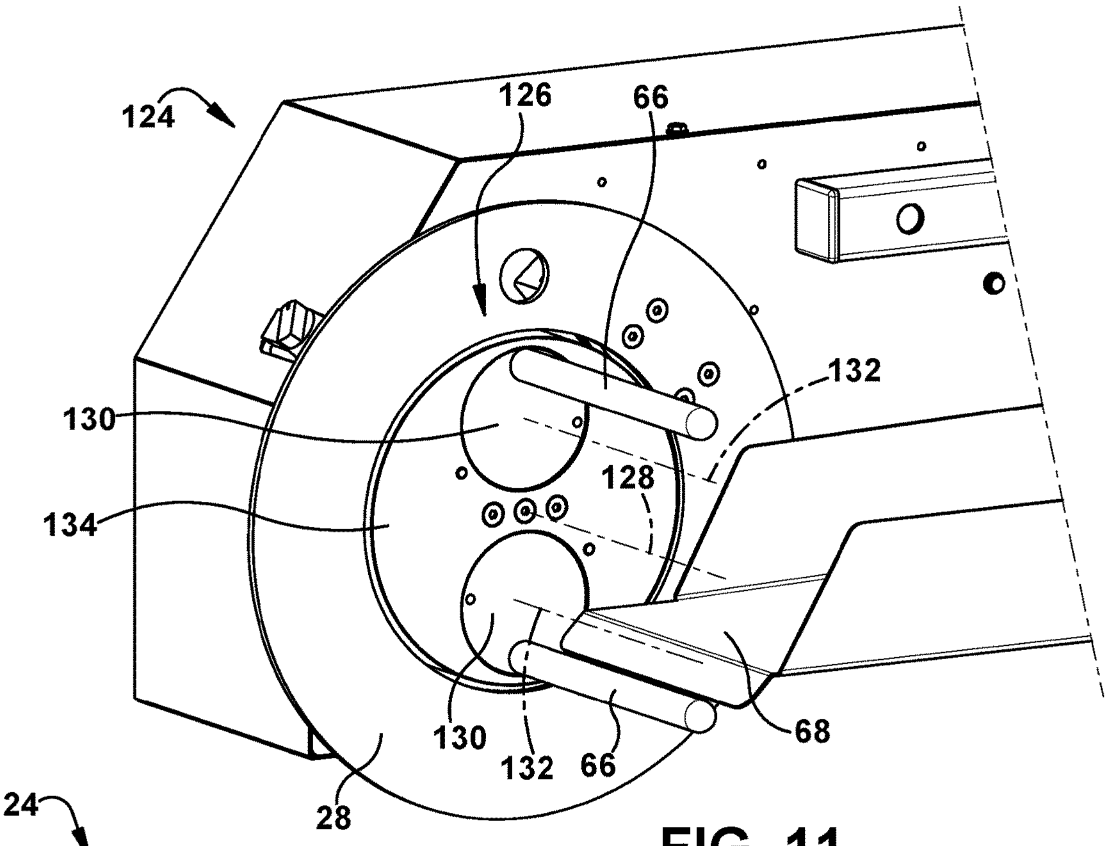
FIG. 11 is a perspective view of an alternative coiler of a dunnage conversion system.
Figure 12:
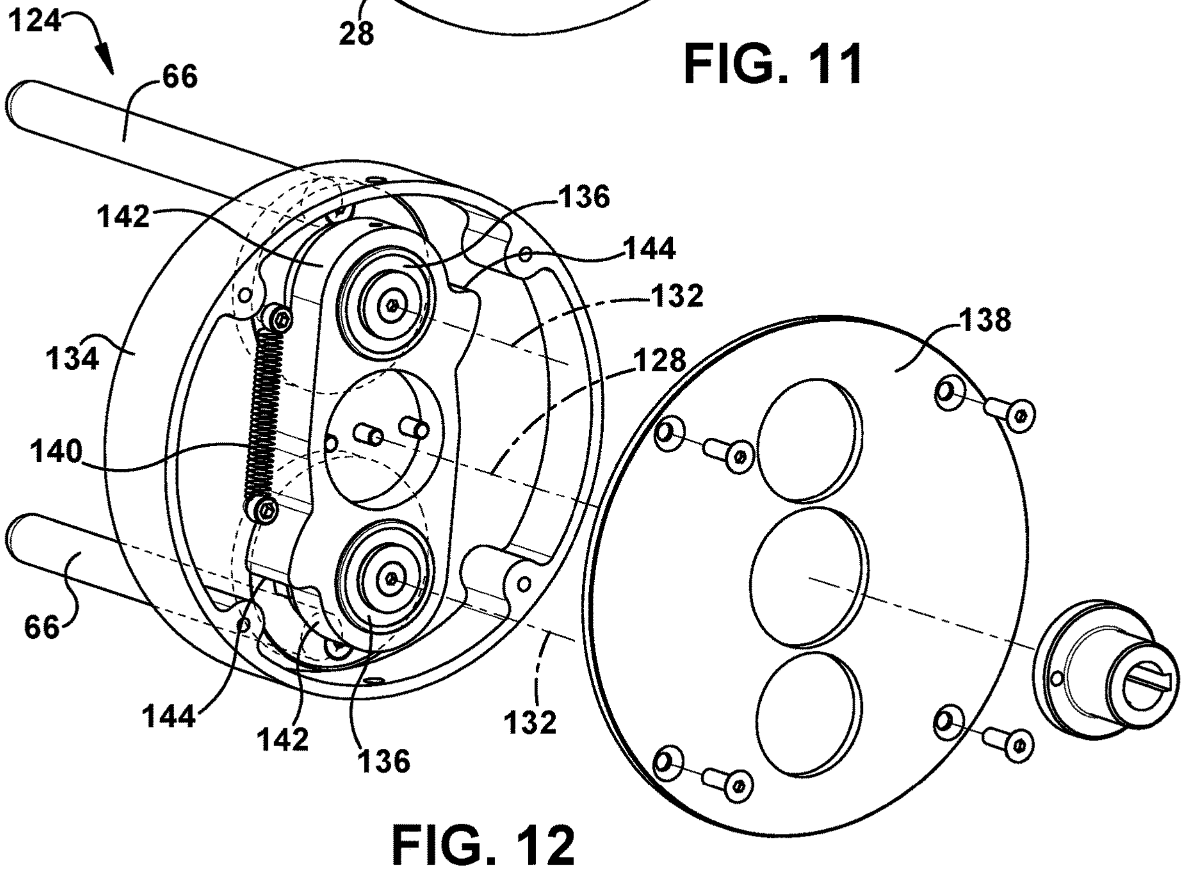
FIG. 12 is an exploded view of the coiler of FIG. 11.

Turning now to an alternative embodiment, FIGS. 11 and 12 show another exemplary coiling mechanism 124 for use in a dunnage conversion system such as is shown in FIG. 2. Outwardly, the coiling mechanism 124 appears similar to the previously-described coiling mechanism 24, is driven by the same driving mechanism, is positioned adjacent an end of the guide surface 68, and works with the coil ejecting mechanism 28 previously described. This coiling mechanism 124 also employs a coiling fork 126 rotatable about a coiling axis 128. The coiling fork 126 includes a pair of spaced but parallel coiling pins 66 that extend in a common direction and are mounted for rotation about the common coiling axis 128, which also is parallel to the coiling pins 66. At least one coiling pin 66 is further mounted to a coiling mount 130 for rotation about a coiling pin axis 132 that is parallel to but offset from both its respective coiling pin 66 and the coiling axis 128. One or both of the coiling pins 66 thus are rotatable about both the coiling axis 128 and a respective coiling pin axis 132. In the illustrated embodiment, both coiling pins 66 are mounted to respective coiling mounts 126.

As in the previous embodiment, the coiling mechanism 124 includes a guide plate 134 with a flat surface facing the same direction as the coiling pins 66. The coiling pin mounts 130 may be flush with the surface of the guide plate 134 to present a continuous surface to the strip of dunnage as it is fed between the coiling pins 66. The front surface of the guide plate 134 may form part of a housing for receiving and supporting the coiling pin mounts 130 and related components. In the illustrated embodiment, the coiling pin mounts 130 have a disk-like shape and are mounted to bearings 136 received in circular openings in the guide plate 130. The bearings 136 rotate about the respective coiling pin axis 132, and the coiling pins 66 are mounted to respective coiling pin mounts 130 offset from but parallel to the coiling pin axis 132. The housing, specifically a back side of the guide plate 130 in the illustrated embodiment, may be enclosed by a back plate 138.

As in the previous embodiment, the coiling pins 66 are spaced apart and oriented relative to the guide surface 68 to receive a leading end of a strip of dunnage between the coiling pins 66 in a strip receiving position. During operation, however, as the coiling pins 66 rotate about the coiling axis 128, the coiling pins 66 can move between the strip receiving position and a coiling position. The spacing between the coiling pins 66 is less in the coiling position than in the strip receiving position. The coiling pins 66 rotate about the coiling axis 128 and at least one of the coiling pins 66 and its coiling pin mount 130 rotate about its coiling pin axis 132, which is offset from but parallel to the coiling axis 128.

In contrast to the cam arrangement of the previous embodiment, however, the offset nature of the coiling pin axis 132 from the respective coiling pin 66 and the central coiling axis 128 provides a simpler construction to achieve a similar effect. The coiling pins 66 and the coiling pin mounts 130 are not free to rotate in any manner. A biasing member 140, such as a spring or an elastic element, located in the housing formed between the guide plate 134 and the back plate 138, biases the pin mount 130 toward the strip receiving position. In the illustrated embodiment, the biasing member 140 is a coil spring (only one shown). The coil spring 140 is connected at one end to the pin mount 130, and at the opposite end to the guide plate 134. As the pin mount 130 rotates, the coil spring 140 is stretched around a spring guide surface 142 formed on a back side of the guide plate 134. The spring guide surface 142 is curved in the illustrated embodiment. The spring guide surface 142 ends at a stop 144 formed in the back of the guide plate 134. The stop 144 defines the furthest extension of the coil spring 140, and also may limit rotation of the pin mount 130.

Figure 13B:
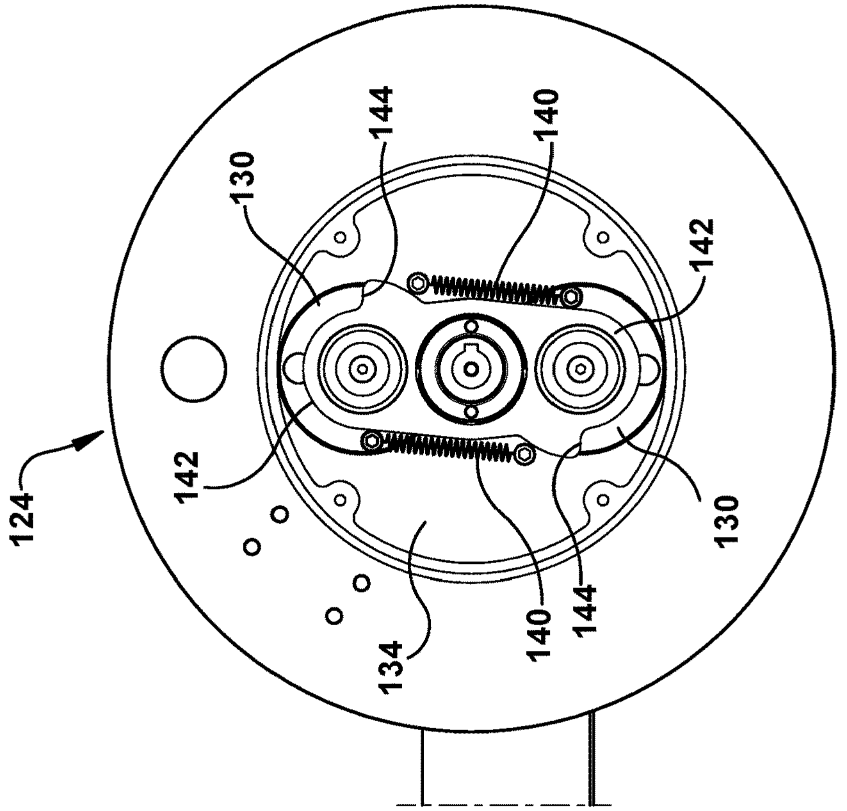
FIG. 13B is a rear elevation view of the coiler of FIG. 13A.
Figure 13A:
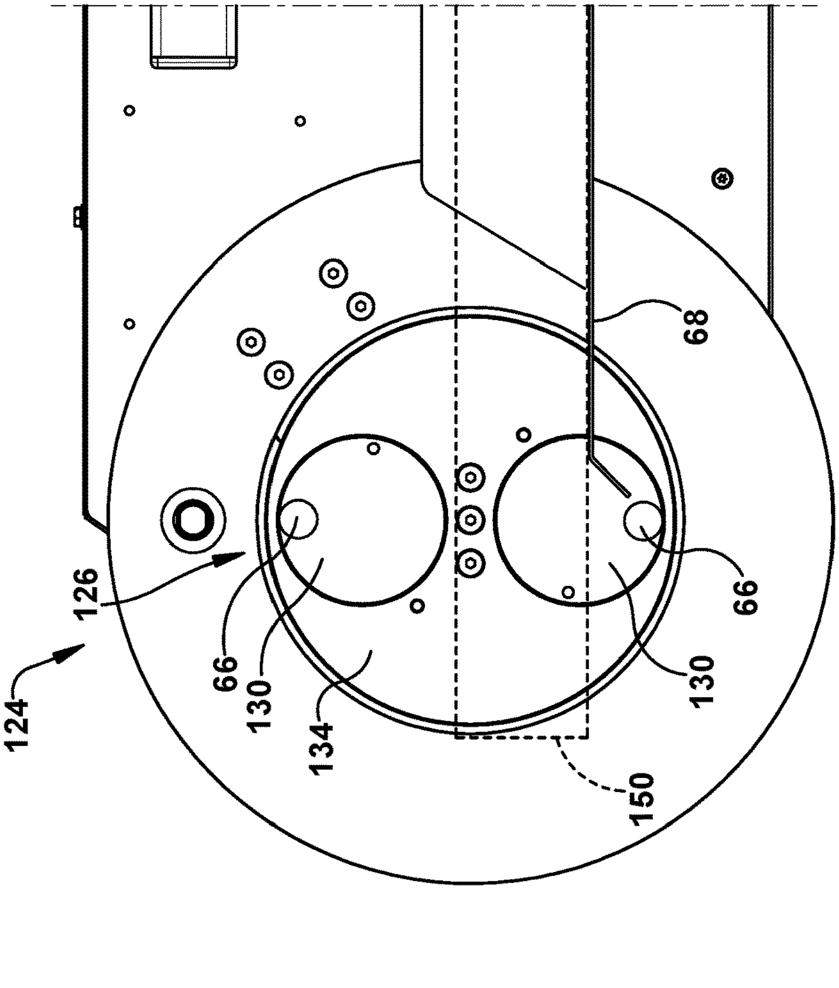
FIG. 13A is a front elevation view of the coiler of FIG. 11 in a strip receiving position.

Operation of the coiling mechanism 124 will now be described with reference to the sequential front and rear views of the coiling mechanism in FIGS. 13A-17B. As shown in FIGS. 13A and 13B, the coiling fork 126 begins in the strip receiving position, with the coiling pins 66 aligned perpendicular to the path of a strip of dunnage 150 (shown in broken lines) guided from a supply such as a dunnage conversion machine 22 (FIG. 2) to the coiling mechanism 124 by the guide surface 68. The relatively wider spacing of the coiling pins 66 in the strip receiving position facilitates passage of a leading end of the strip of dunnage 150 therebetween.

Figure 14B:
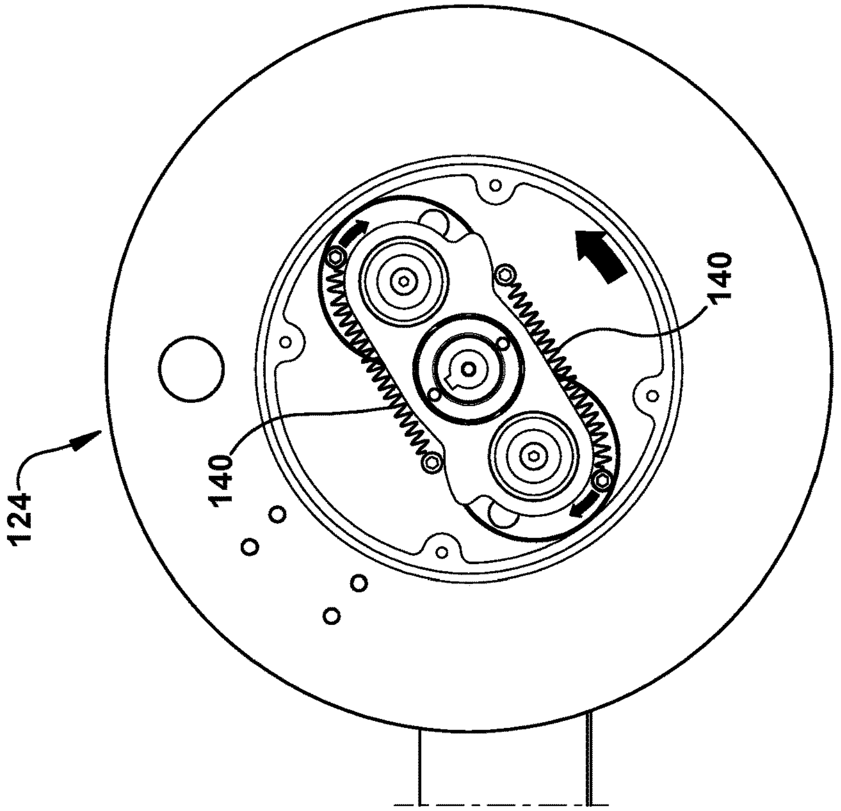
FIG. 14B is a rear elevation view of the coiler of FIG. 14A.
Figure 14A:
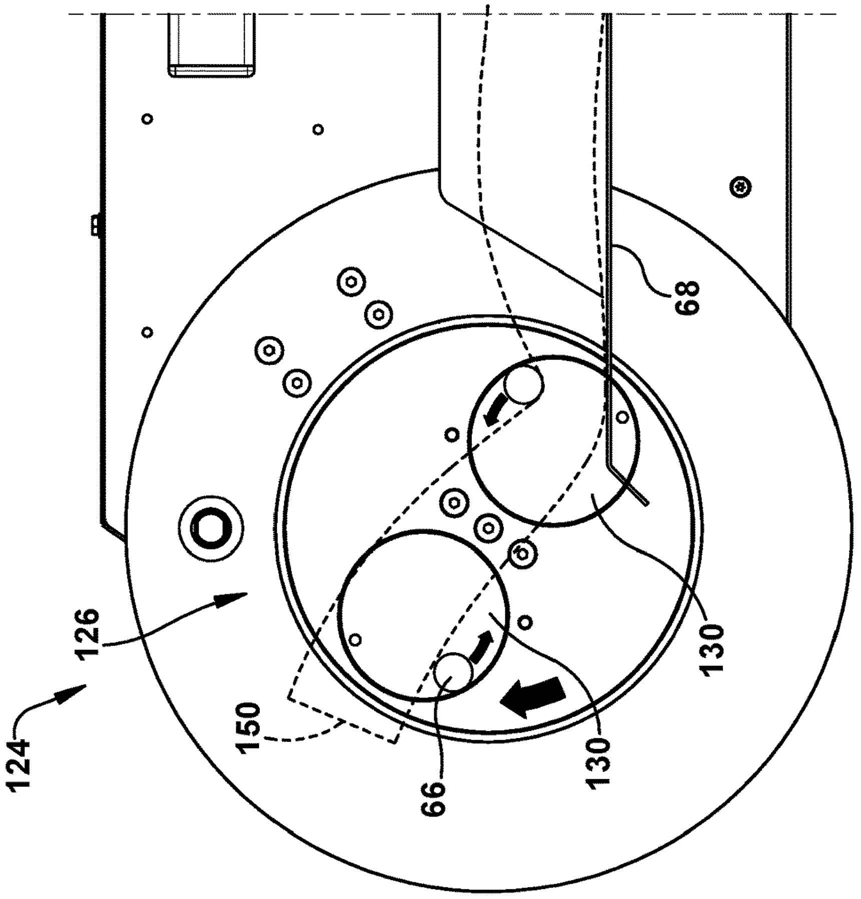
FIG. 14A is a front elevation view of the coiler of FIG. 13A rotated from the strip receiving position.
Figure 15B:
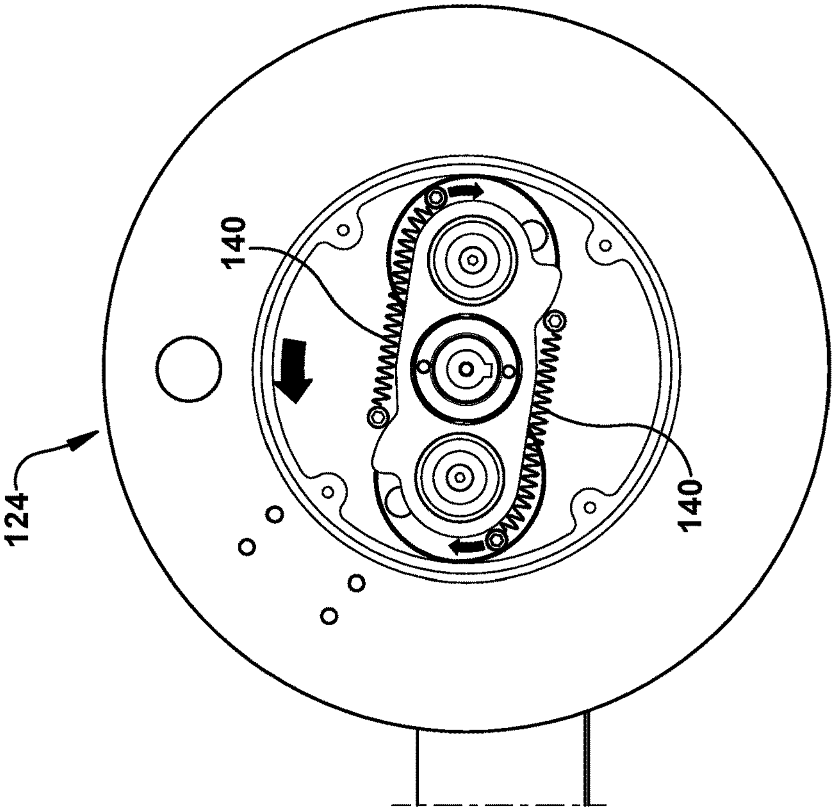
FIG. 15B is a rear elevation view of the coiler of FIG. 15A.
Figure 15A:
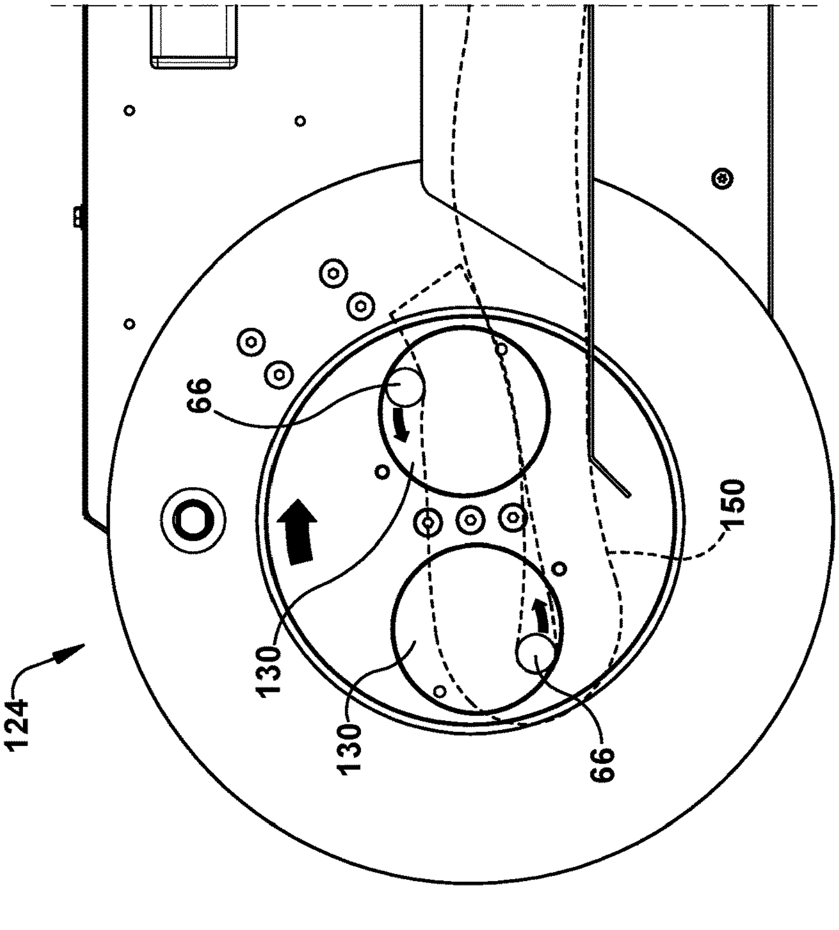
FIG. 15A is a front elevation view of the coiler of FIG. 14A further rotated from the strip receiving position.
Figure 16B:
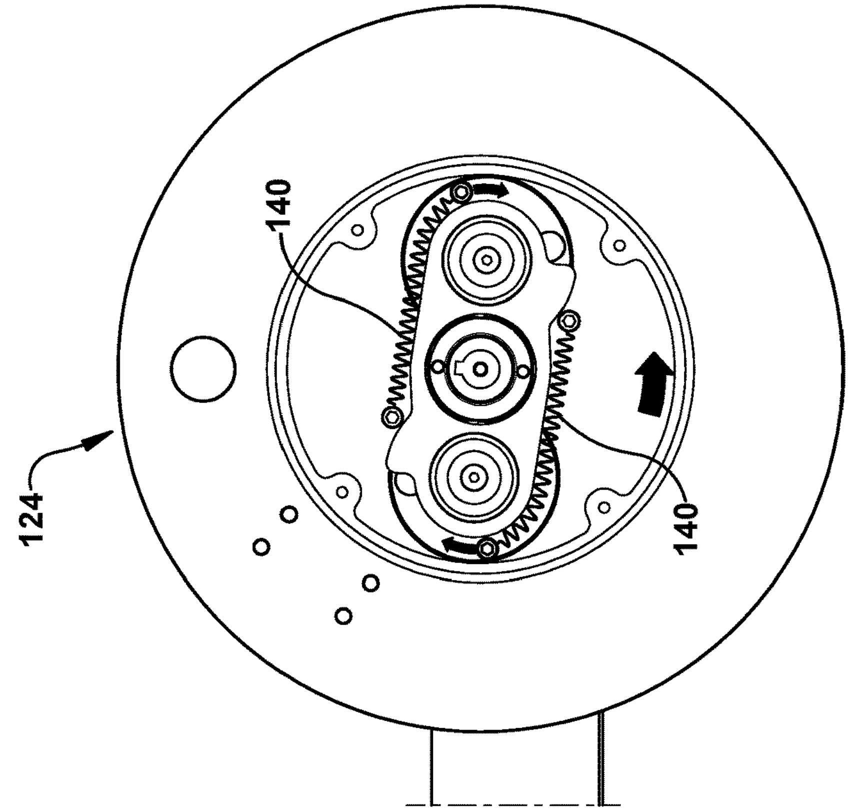
FIG. 16B is a rear elevation view of the coiler of FIG. 16A.
Figure 16A:
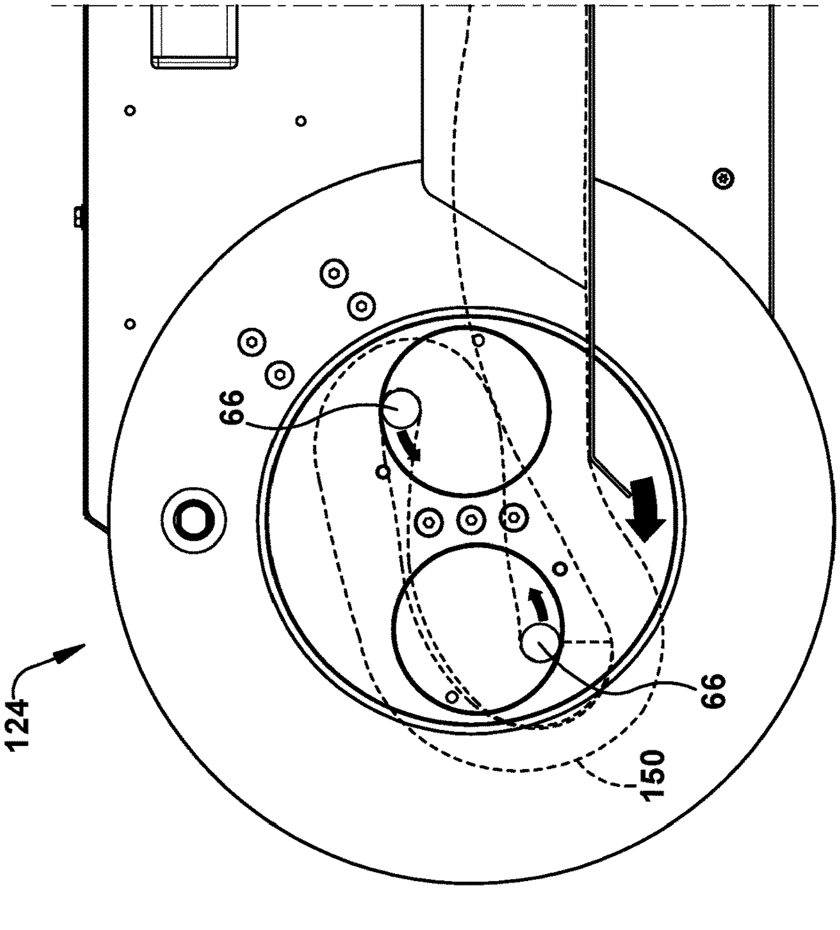
FIG. 16A is a front elevation view of the coiler of FIG. 15A further rotated from the strip receiving position.
Figure 17B:
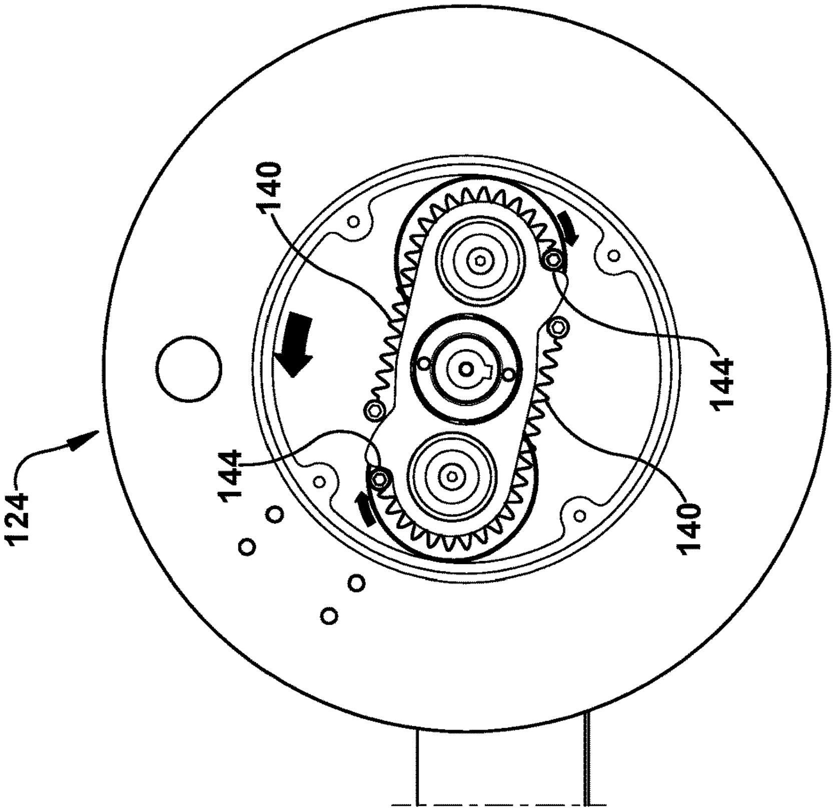
FIG. 17B is a rear elevation view of the coiler of FIG. 17A.
Figure 17A:
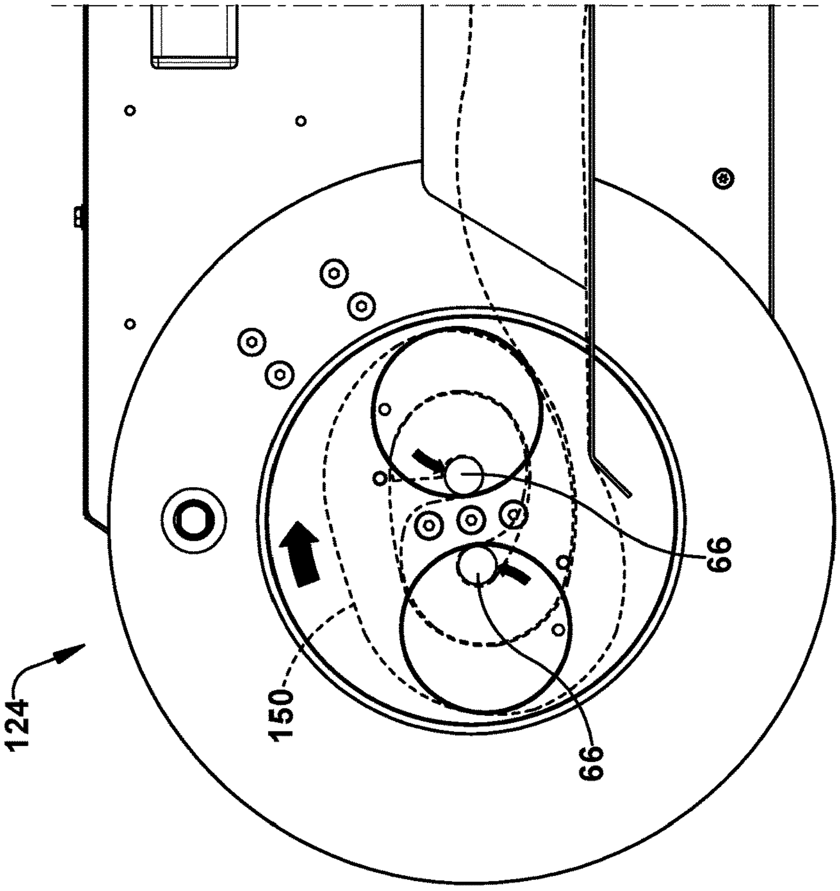
FIG. 17A is a front elevation view of the coiler of FIG. 16A further rotated to the coiling position.

In FIGS. 14A and 14B, the coiling mechanism 124 begins to rotate the coiling fork 125 about the coiling axis, and the coiling pins 66 engage the leading end of the strip of dunnage 150. As the coiling fork 126 continues to rotate and pull the strip of dunnage around the outside of the coiling pins 66, the leading end of the strip of dunnage is further captured between the coiling pins 66 and outer windings of the strip of dunnage 150. At the same time, the coiling pins 66 move inward as they rotate about respective coiling pin axes 132 (FIG. 11) toward the coiling position, rotating in an opposite direction from the direction of rotation about the coiling axis 128. As shown in FIG. 14A, in the illustrated embodiment the coiling fork 126 rotates in a clockwise direction about the coiling axis 128, and the coiling pins 66 each rotate in a counterclockwise direction around a respective coiling pin axis 132.

In the coiling position, the coiling pins 66 are closer together than in the strip receiving position. The resilient nature of a strip of dunnage means that the coiling pins 66 can compress the strip of dunnage 150 in the coiling position without unduly damaging its cushioning properties. And moving the coiling pins 66 closer together enables the coiling mechanism 124 to wind the strip of dunnage 150 into a coil with a relatively compact center.

As should be evident from the foregoing description, no motive elements are required to drive rotation of the coiling pins 66 about respective coil pin axes 132. The speed of rotation of the coiling fork 125 about the coiling axis 128, and the speed at which the strip of dunnage 150 is fed to the coiling mechanism 124, cooperate to cause the pin mounts 130 to rotate against the force applied by the coil spring 140 until the stop 144 is reached. At this point, the coiling pins 66 are in the coiling position, such that the stop 144 defines a minimum distance between the coiling pins 66, and thus the compactness of the core of the resulting coil of dunnage.

Upon removal of the completed coil from the coiling pins 66, the coil springs 140 return the pin mounts 130, and thus the respective coil pins 66, to the strip-receiving position. The coiling fork 126 rotates about the coiling axis 128 to align the coiling pins 66 perpendicular to the path of the strip of dunnage 150 so that the coiling mechanism 124 is ready to receive the leading end of another strip of dunnage.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A system for converting sheet stock material into a coiled strip of dunnage, comprising:

a dunnage conversion machine that converts a sheet stock material into a strip of dunnage, the dunnage conversion machine dispensing the strip of dunnage from an outlet; and a coiler for coiling the strip of dunnage dispensed from the dunnage conversion machine into a coiled strip of dunnage;

wherein the coiler includes a pair of moveable coiling pins extending in a common direction and being rotatable about a common coiling axis, at least one coiling pin mount that supports one of the moveable coiling pins for movement between a strip receiving position and a coiling position radially-inwardly disposed relative to the strip receiving position, and a biasing member that biases the pin mount toward the strip receiving position;

wherein at least one of the pair of movable coiling pins is mounted to the coiling pin mount for rotation about a coiling pin axis that is parallel to but offset from both its respective coiling pin and the coiling axis.

2. The system as claimed in claim 1, wherein the at least one coiling pin mount includes a pair of coiling pin mounts, and each of the coiling pins are mounted to respective coiling pin mounts for rotation about respective coiling pin axes, each of the coiling pin axes being parallel to but offset from both its respective coiling pin and the coiling axis.

3. The system as claimed in claim 2, wherein the coiling pins rotate about the coiling axis and at least one of the coiling pins and its coiling pin mount rotate about its coiling pin axis.

4. The system as claimed in claim 1, wherein each coiling pin is mounted to a respective coiling pin mount.

5. The system as claimed in claim 1, wherein at least one of the at least one coiling pin mount has a disk-like shape and is mounted to bearings received in circular openings in a guide plate.

6. The system as claimed in claim 5, wherein the bearings rotate about the coiling pin axis.

7. The system as claimed in claim 5, wherein the coiling pins move between the strip receiving position and the coiling position, and the distance between the coiling pins is shorter in the coiling position.

8. The system as claimed in claim 5, wherein the at least one coiling pin mount includes two coiling pin mounts.

9. The system as claimed in claim 1, wherein the biasing member includes one or more of a spring and an elastic element.

10. The system as claimed in claim 1, further comprising a stop that limits rotation of the at least one coiling pin mount.

11. The system as claimed in claim 1, wherein the at least one coiling pin mount includes a grooved surface for receipt of the biasing member.

12. The system as claimed in claim 11, wherein the coiling pin mount has a cylindrical shape.

13. The system as claimed in claim 11, wherein the grooved surface is on a curved side of the coiling pin mount.

14. The system as claimed in claim 1, further comprising a supply of stock material for conversion into a relatively less dense dunnage product.

15. A method of coiling a strip of dunnage, comprising the steps of:

providing the system as claimed in claim 1;

receiving the strip of dunnage between the pair of moveable coiling pins;

moving the pair of moveable coiling pins from the strip receiving position to the coiling position; and winding the strip of dunnage into a coil by rotating the moveable coiling pins.

16. The method as claimed in claim 15, where the providing step includes:

supplying a sheet stock material, preferably paper, to the dunnage conversion machine;

converting the sheet stock material into a relatively lower density strip of dunnage; and dispensing the strip of dunnage from the dunnage conversion machine.

17. The method as claimed in claim 15, further including removing the coil in its coiled state from the pair of moveable coiling pins after the winding step is complete.

18. The method as claimed in claim 15, further including automatically returning each of the pair of moveable coiling pins from the coiling position back to the strip receiving position.

19. The method as claimed in claim 15, wherein rotation about the coiling pin axis is counter to rotation about the coiling axis.

20. The method as claimed in claim 15, wherein the moveable coiling pins are each mounted to respective coiling pin mounts for rotation about respective coiling pin axes and each of the movable coiling pins rotate about their respective coiling pin axes in a common direction.

* * * * *